US008584962B2

(12) United States Patent
Hasegawa

(10) Patent No.: US 8,584,962 B2
(45) Date of Patent: Nov. 19, 2013

(54) INFORMATION PROCESSING APPARATUS AND INFORMATION PROCESSING METHOD

(75) Inventor: Keiichi Hasegawa, Koto-ku (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/473,771

(22) Filed: May 17, 2012

(65) Prior Publication Data

US 2012/0298762 A1 Nov. 29, 2012

(30) Foreign Application Priority Data

May 27, 2011 (JP) ................................ 2011-118697

(51) Int. Cl.
*G06K 19/06* (2006.01)

(52) U.S. Cl.
USPC ............................ 235/494; 235/454; 235/375

(58) Field of Classification Search
USPC ............................ 235/494, 454, 375, 462.09
See application file for complete search history.

(56) References Cited

U.S. PATENT DOCUMENTS

| | | | | |
|---|---|---|---|---|
| 2004/0080530 | A1 * | 4/2004 | Lee | 345/738 |
| 2009/0219153 | A1 * | 9/2009 | Ohkawa et al. | 340/540 |
| 2010/0092093 | A1 * | 4/2010 | Akatsuka et al. | 382/203 |
| 2012/0048927 | A1 | 3/2012 | Hasegawa | |
| 2012/0048933 | A1 | 3/2012 | Hasegawa | |

FOREIGN PATENT DOCUMENTS

| | | |
|---|---|---|
| JP | 06-028575 | 2/1994 |
| JP | 2004-227424 | 8/2004 |
| JP | 2006-277198 | 10/2006 |
| JP | 2010-020477 | 1/2010 |
| JP | 2010-237886 | 10/2010 |

OTHER PUBLICATIONS

Japanese Office Action for Japanese Application No. 2011-118697 mailed on Apr. 9, 2013.

* cited by examiner

*Primary Examiner* — Edwyn Labaze
(74) *Attorney, Agent, or Firm* — Turocy & Watson, LLP

(57) ABSTRACT

An image processing system, comprising: a pickup image unit configured to pickup an image contained a commodity and output the picked-up image data; a commodity recognition database configured to recognize the commodity and pre-store recognition data in association with commodity-related information; and a commodity-specified information output unit configured to extract the characteristic quantities of the commodity contained in the image corresponding to the picked-up image data, specify the one or more commodities contained in the image with reference to the recognition data stored in the commodity recognition database, and output the commodity-specified information corresponding to the specified commodity in a format that a settlement terminal apparatus can be readable.

8 Claims, 10 Drawing Sheets

40

| COMMODITY CODE DATA (41) | COMMODITY INFORMATION DATA (42) | FIRST COMMODITY (OBJECT) RECOGNITION DATA (43) |
|---|---|---|
| 1234-56 | DELUXE MELON BREAD | ...... |

INFORMATION PROCESSING APPARATUS AND INFORMATION PROCESSING METHOD

CROSS-REFERENCE TO RELATED APPLICATION

This application is based upon and claims the benefit of priority from Japanese Patent Application No. 2011-118697, filed May 27, 2011, the entire contents of which are incorporated herein by reference.

FIELD

Embodiments described herein relate to an information processing apparatus and an information processing method.

BACKGROUND

At present, it is well known that a bakery or a doughnut shop deals in commodity that a product life cycle is relatively short and is relatively wide varieties of small quantity A settlement terminal apparatus (POS terminal apparatus) identical to but less functional than the settlement terminal apparatus (POS terminal apparatus) set in a supermarket is also used in such a shop in which is relatively short and is relatively wide varieties of small quantity.

DETAILED DESCRIPTION

According to one embodiment, an image processing system, comprising: a pickup image unit configured to pickup an image contained a commodity and output the picked-up image data; a commodity recognition database configured to recognize the commodity and pre-store recognition data in association with commodity-related information; and a commodity-specified information output unit configured to extract the characteristic quantities of the commodity contained in the image corresponding to the picked-up image data, specify the one or more commodities contained in the image with reference to the recognition data stored in the commodity recognition database, and output the commodity-specified information corresponding to the specified commodity in a format that a settlement terminal apparatus may be readable.

Embodiments are described in detail below with reference to accompanying drawings.

Figure 1:
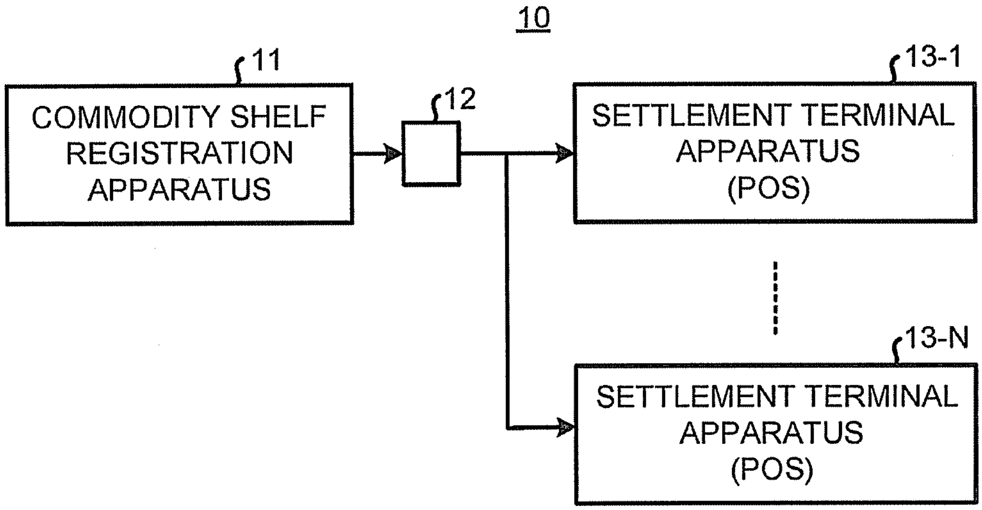
FIG. 1 is a block diagram roughly showing the components of a settlement system according to an embodiment.

FIG. 1 is a block diagram roughly showing the components of a settlement system according to an embodiment sheet.

The following description is based on the application of a settlement system in a bread shop (bakery) where self-produced breads are produced and a customer places the chosen breads in a tray and then pays (settles the account of) at a cash register.

A settlement system 10 comprises: a commodity shelf registration apparatus 11 configured to specify the one or more commodities (breads) placed in a tray to register the commodities uniformly; and a plurality of settlement terminal apparatuses (POS terminal apparatuses) 13-1 to 13-*n* configured to read, accompanied with the uniform registration, a commodity pre-registration sheet 12 that is issued by the commodity shelf registration apparatus 11 and will be described later to carry out a settlement processing.

Figure 2:
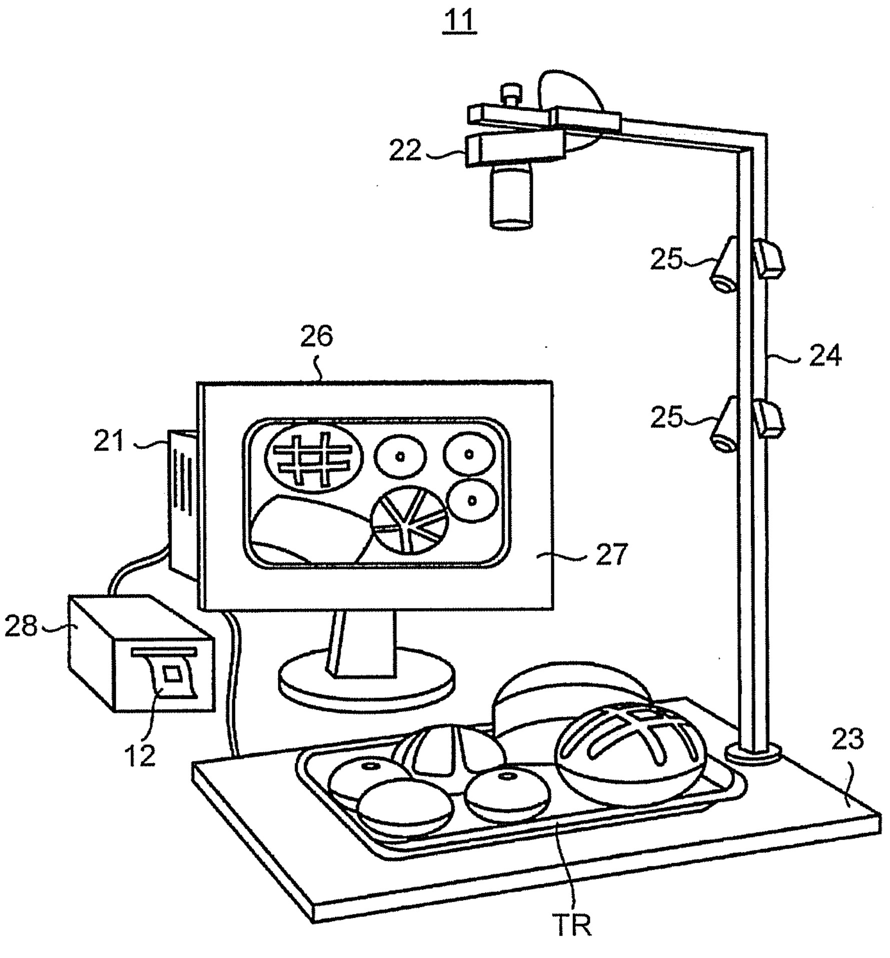
FIG. 2 is an external perspective view of a commodity shelf registration apparatus.

FIG. 2 is an external perspective view of the commodity shelf registration apparatus.

The commodity shelf registration apparatus 11, which will be described in detail later, comprises: a main body 21; a camera unit 22 configured to pickup a commodity (bread)-carrying tray (TR) from above; a holding platform 23 for holding the TR; a rear portion 24 fixed on the holding platform 23 to keep the camera unit 22 and an illumination unit 25 at given positions; a display 26 for displaying the pickup image condition and various other information of the camera unit 22; a touch panel sensor 27 configured on the display screen of the display 26 for realizing various operations; and a printer 28 for printing and outputting a commodity pre-registration sheet 12.

Figure 3:
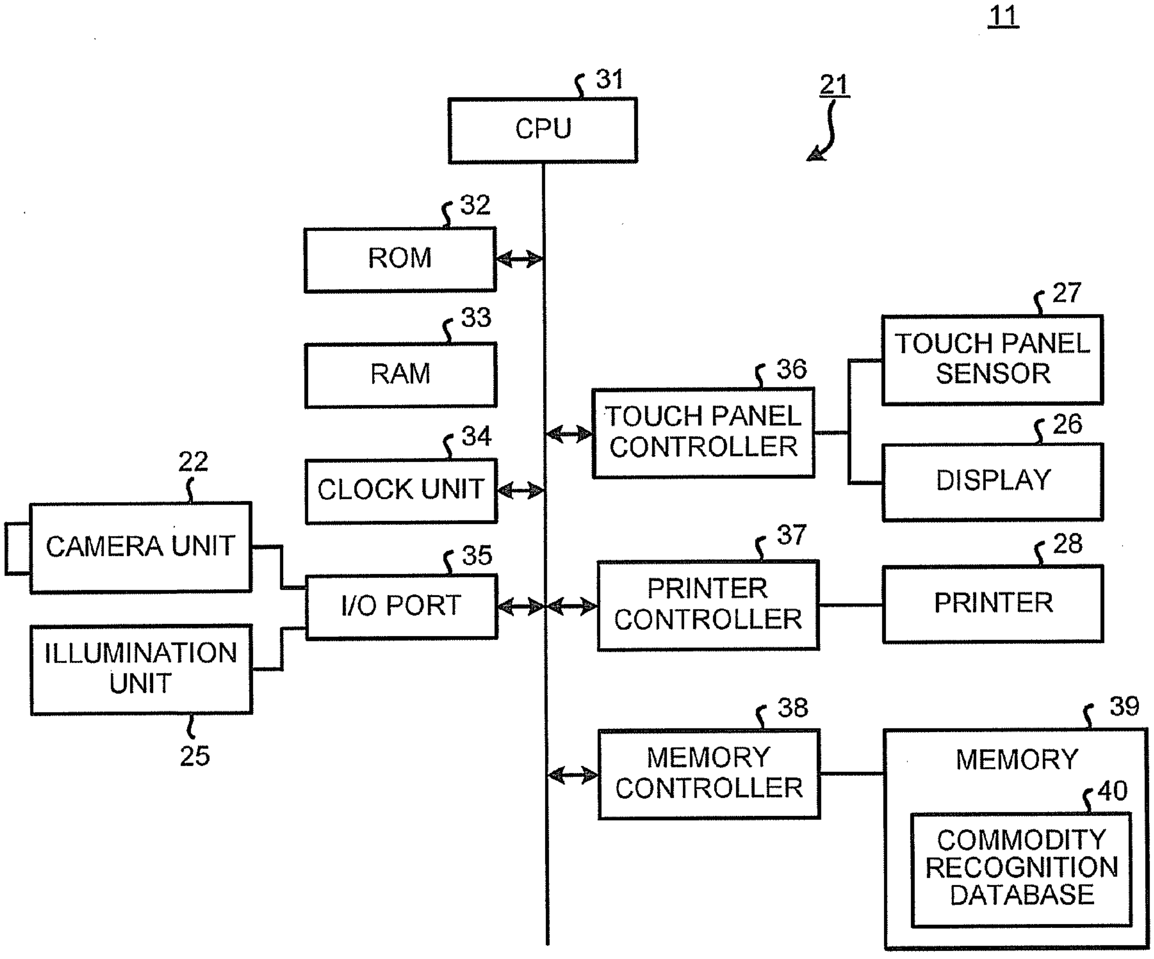
FIG. 3 is a block diagram roughly showing the components of the commodity shelf registration apparatus.

FIG. 3 is a block diagram roughly showing the components of the commodity shelf registration apparatus.

The commodity shelf registration apparatus 11 comprises a CPU (Central Processing Unit) 31 for executing various operations to control each other unit; an ROM (Read Only Memory) 32 for storing control programs in a nonvolatile manner; and an RAM (Random Access Memory) 33 for storing various kinds of data temporarily to form a working area, wherein the foregoing units are connected via a bus line. The commodity shelf registration apparatus 11 further comprises: a clock unit 34 for timing the current date and time; an I/O (Input/Output) port 35 for connecting the camera unit 22 with the illumination unit 25 in a controllable manner; a touch panel controller 36 for controlling the display 26 and the touch panel sensor 27 under the control of the CPU 31; a printer controller 37 for controlling the printer 28 under the control of the CPU 31; and a memory controller 38 for controlling, under the control of the CPU 31, a high-capacity memory 39 consisting of a hard disc drive or an SSD (Solid State Drive) and capable of storing a variety of data in an updateable manner. In the structure above, a commodity recognition database 40 is contained in the memory 39.

Figure 4:
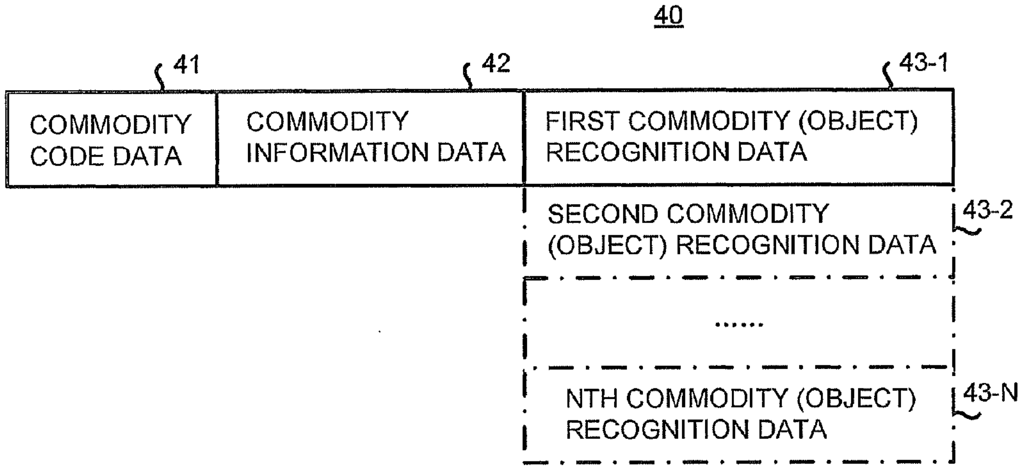
FIG. 4 is a diagram illustrating an example of a data format of a commodity recognition database.

FIG. 4 is a diagram illustrating an example of a data format of the commodity recognition database.

The commodity recognition database 40 includes: commodity code data 41 for storing the commodity code that is uniquely distributed to a commodity; commodity information data 42 for storing commodity-related information such as commodity name; and a first to a nth pieces of commodity recognition data 43-1 to **43-*n*** for recognizing a commodity through an object recognition based on the characteristic quantities extracted from a picked-up image contained commodity.

In this case, there is no need to store the n pieces of commodity recognition data, only the first piece of commodity recognition data 43-1 is stored in the initial state. Then, if the recognition on the same commodity is not carried out smoothly, in order to improve the rate of recognition, a learning process is carried out to orderly add the second to the nth pieces of commodity recognition data 43-2 to **43-*n*** for the un-smoothly recognized image.

The outline, color, color configuration and other characteristic quantities of the commodity (bread) are extracted and stored as the first to nth pieces of commodity recognition data 43-1 to **43-*n***.

Moreover, the technology for recognizing a commodity (target; object) contained in an image is explicated in detail in the following document:

Keiji Yanai, "The current status and future of generic object recognition", Journal of Information Processing Society, Vol. 48, No. SIG 1 [searched on Aug. 10, 2010], Internet: <URL: http://mm.cs.uec.ac.jp/IPSJ-TCVIM-Yanai.pdf>.

In addition, the technology for object-recognizing by area-segmenting the image every object is described in the following document:

Jamie Shotton et al., "Semantic Texton Forests for Image Categorization and Segmentation", [searched on Aug. 10, 2010], Internet: <URL:http://citeseerx.ist.psu.edu/viewdoc/download?doi=10.1.1.145.3036&rep=rep1&typ e=pdf>.

Figure 5:
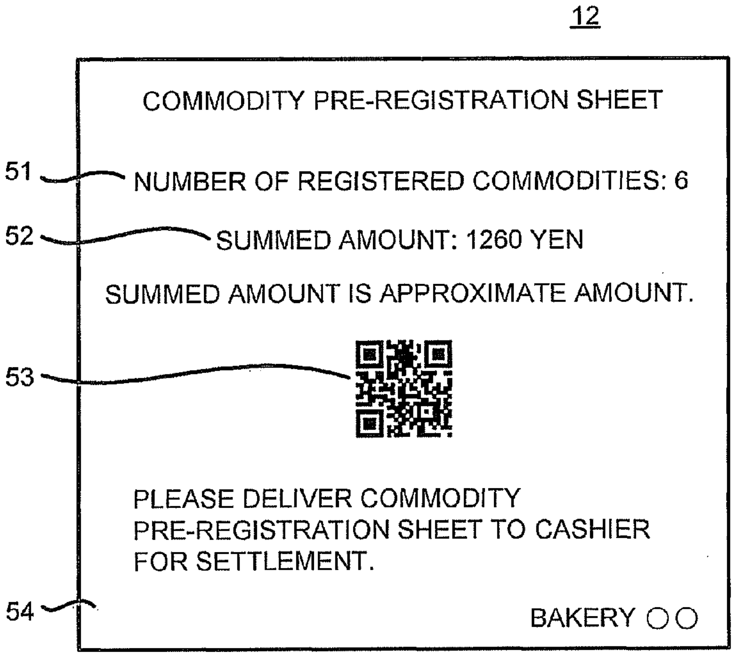
FIG. 5 is a diagram illustrating an example of a commodity pre-registration sheet.

FIG. 5 is a diagram illustrating an example of a commodity pre-registration sheet.

The commodity shelf registration apparatus 11 may specify the commodity (bread) on the TR after completing object recognition, and a commodity pre-registration sheet 12 containing the information of all the specified commodities is printed and output by the printer 28.

As shown in FIG. 5, the commodity pre-registration sheet 12 comprises: a registered commodity number printing area 51 in which the number of the specified and registered commodities is printed; a summed amount printing area 52 in which the summed amount of the registered commodities is printed; a two-dimensional barcode printing area 53 in that two-dimensional barcodes contained all of the commodity codes of the registered commodities as information is printed; and an annotation printing area 54 in which various annotations and shop names are printed.

Specifically, it may be known from the example shown in FIG. 5 that the number of the registered commodities is 6 (according to the information in the registered commodity number printing area 51), the approximate summed amount is 1260 yen (according to the information in the summed amount printing area 52), and that the commodity pre-registration sheet 12 is delivered to a cashier for a settlement (according to the information in the annotation printing area 54).

Figure 6:
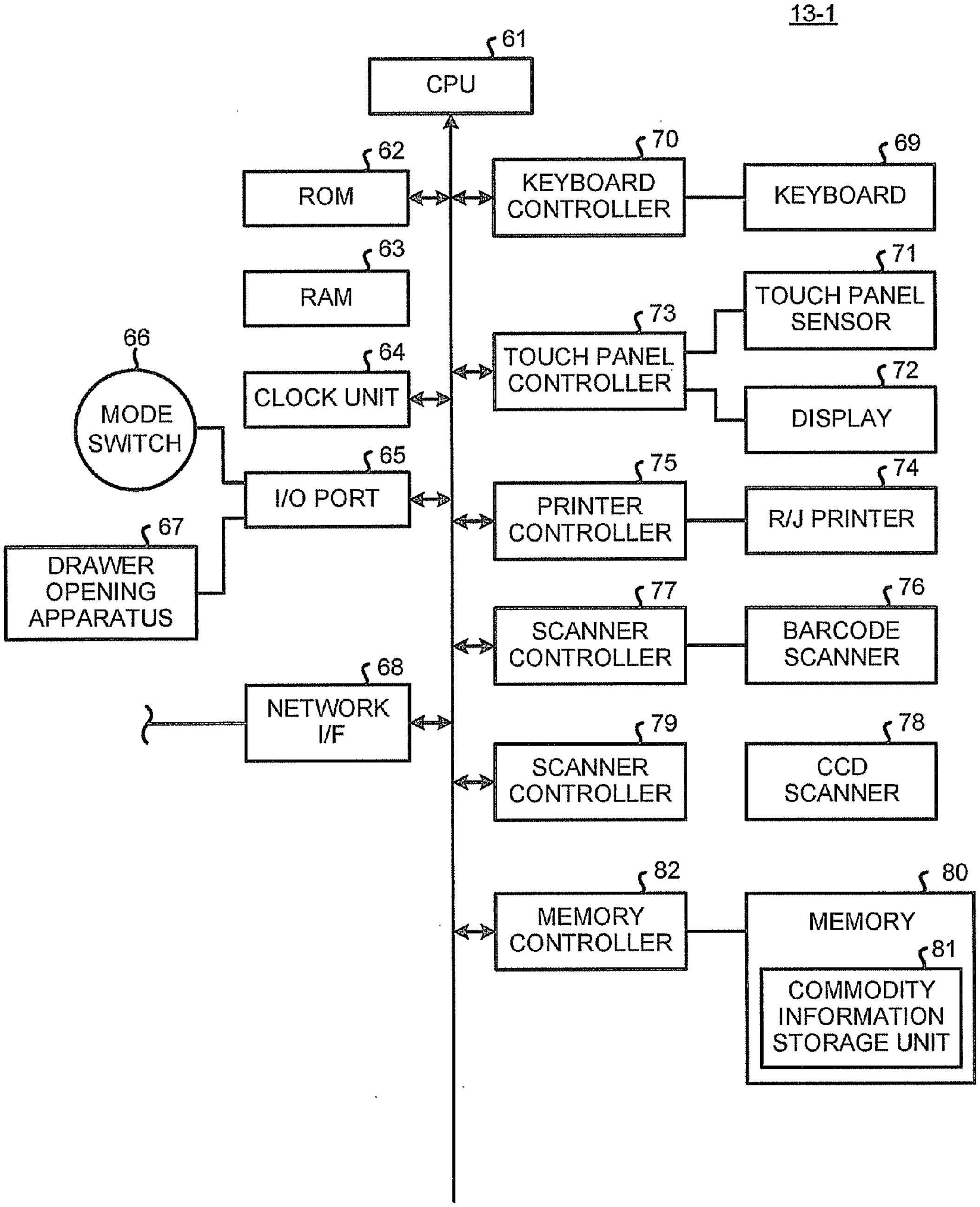
FIG. 6 is a block diagram roughly showing the components of a settlement terminal apparatus (POS terminal apparatus)

FIG. 6 is a block diagram roughly showing the components of a settlement terminal apparatus (POS terminal apparatus).

As settlement terminal apparatuses (POS terminal apparatuses) 13-1 to **13-*n* are structurally identical in this case, only a settlement terminal apparatus 13-1 is illustrated as an example. As shown in FIG. 6, the settlement terminal apparatus 13-1 comprises: a CPU 61, an ROM 62, an RAM 63, a clock unit 64, an I/O port 65, a network interface 68, a keyboard 69, a keyboard controller 70, a touch panel sensor 71, a display 72, a touch panel controller 73, a receipt/journal printer 74 (marked as R/J printer in FIG. 6), a printer controller 75, a barcode scanner 76, a scanner controller 77, a CCD scanner 78, a scanner controller 79, a memory 80 and a memory controller 82**.

Here, the CPU 61, the ROM 62, the RAM 63, the clock unit 64, the I/O port 65, the network interface 68, the keyboard controller 70, the touch panel controller 73, the printer controller 75, the scanner controller 77, the scanner controller 79 and the memory controller 82 are connected with each other via bus lines such as address bus line or data bus line.

The CPU 61 controls the whole settlement terminal apparatus 13-1 by executing the various computer-readable programs stored in the ROM 62. The ROM 62 stores the various programs and data executed by the CPU 61. The RAM 63 functions as a working area to temporarily store the various programs and data executed by the CPU 61.

The clock unit 64 times the current date and time. The I/O port 65 receives a mode selection signal from a mode switch 66 and synchronously outputs a drive signal to a drawer opening apparatus 67 drawn out from an automatic cash drawer (not shown). The network interface 68 controls the data communication between other apparatuses that are connected with each other via a wired communication network.

The keyboard controller 70 acquires a key signal corresponding to an operating key from the keyboard 69 and informs the CPU 61 of the acquired key signal.

The touch panel controller 73 controls the drive of the display 72 additionally provided with a touch panel, displays color words corresponding to the display data provided by the CPU 61 while acquiring a signal from the touch panel sensor 71 installed on the screen of the display 72, and informs the CPU 61 of the acquired signal.

The printer controller 75 controls the drive of the R/J printer 74 and prints a receipt and a journal account based on the printing data provided by the CPU 61.

The barcode scanner 76 optically reads the barcode adhered on a commodity. The scanner controller 77 acquires the data signal read by the barcode scanner 76 and inputs the acquired signal to the CPU 61.

The CCD scanner 78 optically read a two-dimensional barcode contained in the two-dimensional codes recorded in the commodity pre-registration sheet 12.

The scanner controller 79 acquires the data signal read by the CCD scanner 78 and inputs the acquired signal to the CPU 61.

The memory controller 82 controls the writing of data into or the readout of data from the memory 80 under the control of the CPU 61.

The memory 80 consisting of, for example, a hard disc drive and an SSD, comprises a commodity information storage unit 81 for storing the programs run by the CPU 61 as well as the commodity data containing various commodity information.

The commodity data stored in the commodity information storage unit 81 includes, for example, the code, the name and the unit price of a commodity.

Next, the actions carried out in the embodiments described herein are described.

Figure 7:
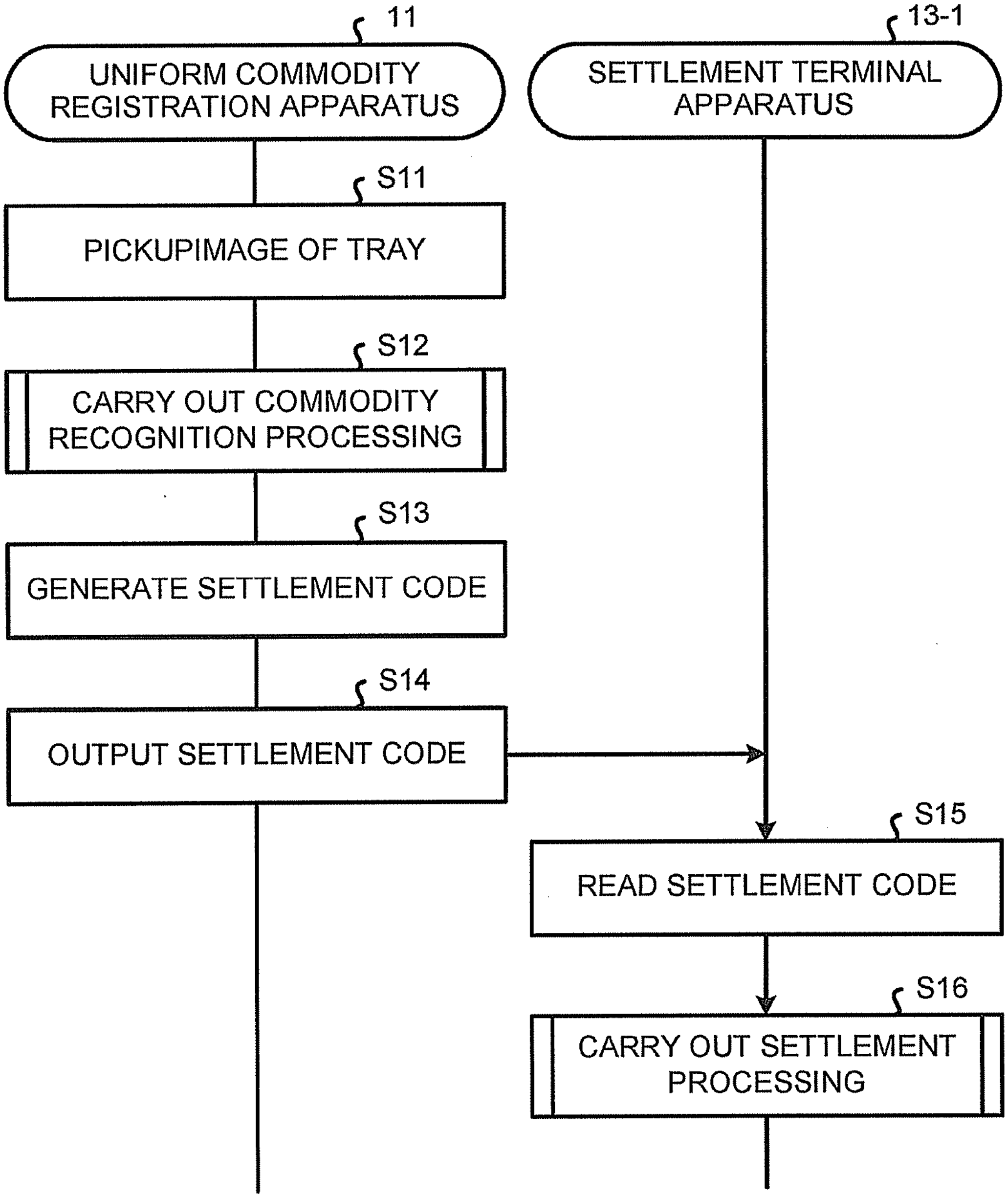
FIG. 7 is a timing chart showing the processing of the settlement system according to the embodiment.

FIG. 7 is a timing chart showing the processing of a settlement system according to the embodiment.

First, a customer places the chosen breads in a TR to purchase the breads, and the operator of the commodity shelf registration apparatus 11 places the TR on the holding platform 23, as shown in FIG. 2. At this time, in order to recognize the commodities more precisely, as many overlapped breads should be decreased as possible.

Moreover, the CPU 31 of the commodity shelf registration apparatus 11 pickups the TR (Act S11) when a completed pickup image preparation is recognized automatically (for instance, it is detected in the image picked-up by the camera unit 22 that the quantity of motion is below a given one) or an indication is input by the operator from the touch panel sensor 27.

Then, the CPU 31 of the commodity shelf registration apparatus 11 carries out a commodity recognition processing to recognize the commodities on the TR (Act S12).

Figure 8:
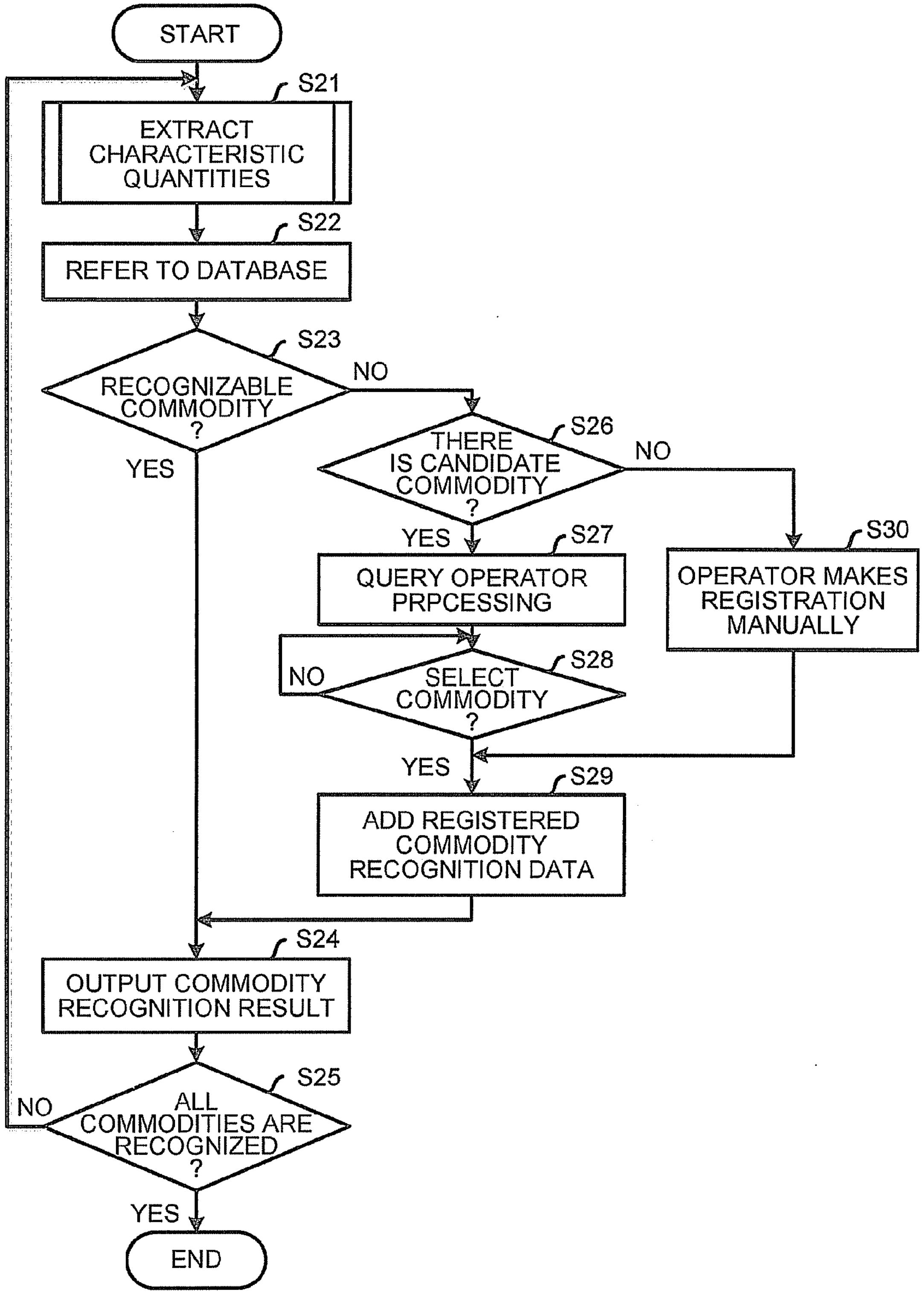
FIG. 8 is a flow chart showing a commodity recognition processing.

FIG. 8 is a flow chart showing a commodity recognition processing.

First, the CPU 31 extracts the characteristic quantities of a commodity according to the picked-up image corresponding to the pickup image data input by the camera unit 22 through the I/O port 35.

Figure 9:
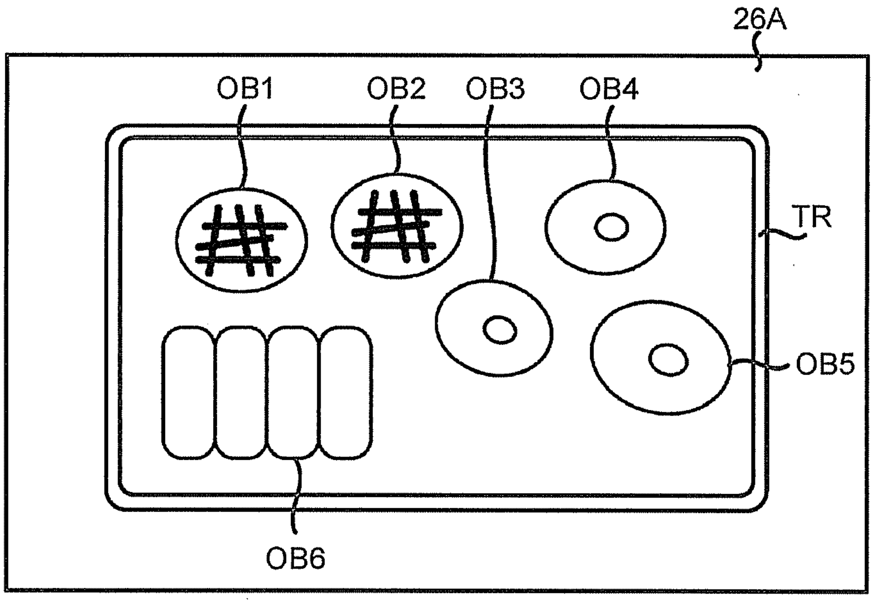
FIG. 9 is a diagram illustrating an example of a picked-up image displayed on the display screen of a display.

FIG. 9 is a diagram illustrating an example of a picked-up image displayed on the display screen of a display.

The six breads (commodities) placed on a TR are displayed on the display screen 26A of the display 26 as six objects OB1-OB6. Therefore, the CPU 31 of the commodity shelf registration apparatus 11 separates the objects OB1-OB6 based on the outlines thereof, and synchronously extracts the shapes, the surface colors and the surface color distribution of the outlines as characteristic quantities (Act S21.)

Next, the CPU 31 retrieves the commodity recognition data 43-*x* matched with (e.g. having a high similarity with) the characteristic quantities of the objects OB1-OB6 with reference to the commodity recognition database 40 stored in the memory 39 (Act S22).

According to the searched result, determine whether or not there is a commodity which is equal to or greater than the predetermined threshold, that is, it is able to determine that may recognize commodity according to the matching degree of which with the characteristic quantities (Act S23).

If it is determined that the commodity may be recognized in the determination process of Act S23 (Act S23: Yes), output the commodity code data 41 and the commodity information data 42 corresponding to the commodity recognition data 43-*x* which is equal to or greater than the predetermined threshold, that is, it is able to determine that may recognize commodity according to the matching degree of which with the characteristic quantities as the result of the recognizing of commodity (Act S24).

Next, the CPU 31 determines whether or not all the commodities (objects) contained in the picked-up image are recognized (Act S25), and returns to execute Act S21 and the following Acts if the commodities (objects) contained in the picked-up image are not all recognized (Act S25: No).

Moreover, the CPU 31 ends the processing if the commodities (objects) contained in the picked-up image are all recognized in Act S25 (Act S25: Yes).

On the other hand, if may not recognize commodity in the determination process of Act S23 (Act S23: No), then the CPU 31 determines whether or not there is the commodity recognition data 43-*x* which is equal to or greater than the predetermined threshold as a candidate for recognizing commodity (Act S26).

In the determination process of Act S26, if the CPU 31 determines that there is the commodity recognition data 43-*x* which is equal to or greater than the predetermined threshold as a candidate for recognizing commodity (Act S26: Yes), the commodity information data 42 corresponding to the one or more pieces of candidate commodity recognition data 43-*x* is extracted and displayed on the display screen of the display 26 as a candidate commodity, then conduct an inquiry to makes a store clerk which is operator to select (Act S27).

By this, a store clerk which is operator determines which candidate commodity is to be selected (Act S28).

The apparatus enters into a standby state if no candidate commodity is selected in the determination process of Act S28 (Act S28: No), If the store clerk selects a candidate commodity in the determination process of Act S28 (Act S28: Yes), the commodity code data 41 and the commodity information data 42 corresponding to the commodity recognition data 43-*x* of the selected commodity are added in the commodity recognition result (Act S29), and then the commodity recognition result is output (Act S24).

Moreover, if a commodity recognition may not be carried out according to the matching degree of the characteristic quantities in the determination process of Act S26 and there is no commodity recognition data 43-*x* serving as a candidate for recognizing commodity (Act S26: No), conduct an inquiry to makes a store clerk which is operator to make registration manually, and have a store clerk make registration manually (Act S30). Moreover, the commodity code data 41 and the commodity information data 42 corresponding to the manually-registered commodities are added in a commodity recognition result (Act S29), and then the commodity recognition result is output (Act S24).

Further, in some condition of the shop, assume that there is an unregistered commodity, may be manually input in the settlement terminal apparatus 13-1, without querying the operator (Act S27) or making a manual registration by the store clerk (Act S30).

The CPU 31 of the commodity shelf registration apparatus 11 generates a two-dimensional settlement barcode (Act S13) after the commodity recognition processing (Act S12) is completed.

The two-dimensional settlement barcode contains the commodity code data 41 and the commodity information data 42 corresponding to the one or more commodities that are recognized in the commodity recognition processing (Act S12) and then output as a commodity recognition result.

Moreover, the CPU 31 of the commodity shelf registration apparatus 11 controls the printer 28 through the printer controller 37 to print a commodity pre-registration sheet 12 in which the generated two-dimensional barcode is printed in the two-dimensional barcode printing area 53 (Act S14).

Subsequently, the customer takes the commodity pre-registration sheet 12 from the operator of the commodity shelf registration apparatus 11 and gives the commodity pre-registration sheet 12 together with the commodities placed on the TR to the operator of the settlement terminal apparatus 13-1.

Then, the operator of the settlement terminal apparatus 13-1 reads the two-dimensional barcode in the commodity pre-registration sheet 12 with the CCD scanner 78 (Act S15).

Based on the commodity code data contained in the two-dimensional barcode input from the scanner controller 79, the CPU 61 of the settlement terminal apparatus 13-1 carries out an ordinary settlement processing according to the types and the quantity of the purchased commodities, and a receipt is output through the RJJ printer 74 (Act S16).

As stated above, in accordance with this embodiment, commodities are registered in a lump on a two-dimensional barcode in a commodity pre-registration sheet through an object recognition, thus, compared with a one-by-one commodity registration mode, this commodity shelf registration mode enables all commodities to be registered in a short time, even a part-time shop assistant unfamiliar with a commodity/cash register registration may carry out a settlement processing, and may prevent mistaking of selling price before they occur.

Besides, there is no need to add a barcode on a commodity for a registration in a cash register, therefore, even a commodity (for example, bread) that will become less fresh by absorbing moisture if packaged because of the moisture generated in the packaging may be easily kept fresh.

However, the commodity shelf registration apparatus 11 described in this embodiment may be imported independent from the settlement terminal apparatuses 13-1 to 13-*n* existing in the shop.

That is, a registration function of reading a two-dimensional barcode for a settlement and a function of printing a two-dimensional barcode for new commodities registered in the settlement terminal apparatuses 13-1 to 13-*n* using the R/J printer 14 may be imported as the functions of existing settlement terminal apparatuses 13-1 to 13-*n*. Below is description on the data federation realized between the commodity shelf registration apparatus 11 and existing settlement terminal apparatuses 13-1 to 13-*n* in this case.

Figure 10:
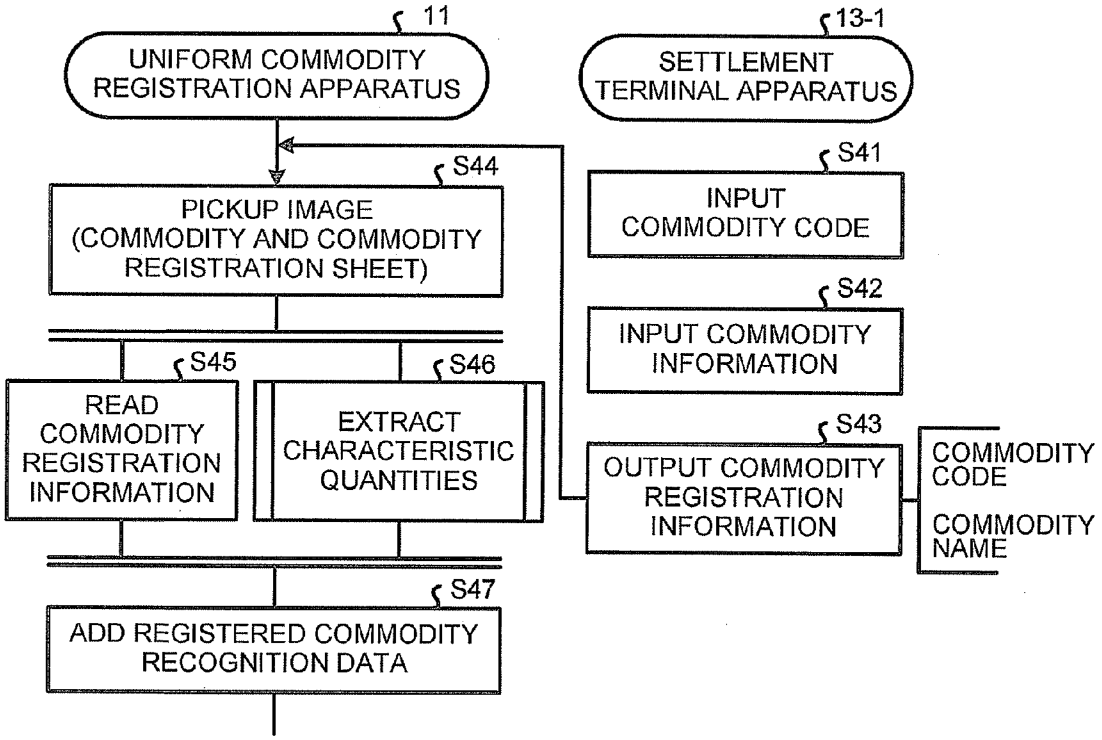
FIG. 10 is a timing chart of a data federation for a new commodity registration.

FIG. 10 is a timing chart of a data federation for a new commodity registration.

The following description is based on an example in which necessary commodity recognition data is uniformly registered in the commodity shelf registration apparatus 11 using the settlement terminal apparatus 13-1. First, when desiring to register a new commodity, the operator of the settlement terminal apparatus 13-1 inputs a commodity code to register the new commodity (Act S41). Moreover, the distribution of a commodity code may be carried out by the settlement terminal automatically.

Next, the commodity information (e.g. price, name) needed for the settlement of the commodity having the commodity code is input (Act S42). The commodity information may be input manually, or a one-dimensional or two-dimensional barcode of the commodity is scanned using the barcode scanner 76 or the CCD scanner 78.

Figure 11:
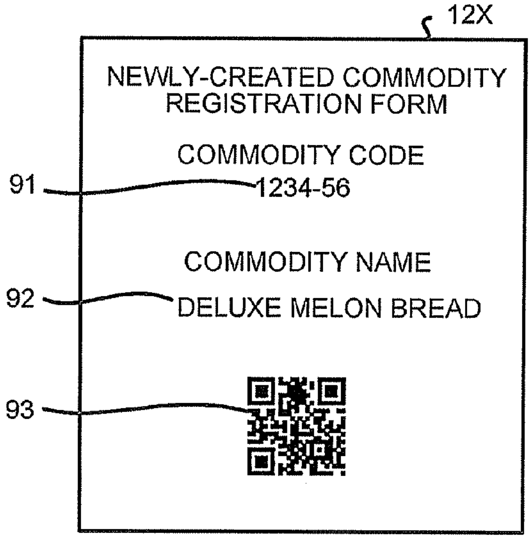
FIG. 11 is a diagram illustrating an example of a newly-created commodity registration sheet.

FIG. 11 is a diagram illustrating an example of a newly-created commodity registration sheet.

Here, under the control of the printer controller 75, the CPU 61 of the settlement terminal apparatus 13-1 uses the R/J printer 74 to print a new commodity registration sheet 12*x* as the output commodity registration information (Act S43).

The new commodity registration sheet 12*x* includes: a commodity code printing area 91 in which a commodity code for the operator of the commodity shelf registration apparatus 11 to carry out a commodity code confirmation when creating a new commodity registration is printed; a commodity information printing area 92 in which the commodity information for the operator of the same commodity shelf registration apparatus 11 to confirm a commodity name and other commodity information when creating a new commodity registration is printed; and a barcode printing area 93 in which a two-dimensional barcode containing commodity barcode data and commodity information data is printed.

With the new commodity registration sheet 12*x*, a new commodity registration processing may be easily carried out at one side of the commodity shelf registration apparatus 11.

First, the operator of the commodity shelf registration apparatus 11 pickups the commodity of a newly registered object (Act S44).

Figures 12, 13:
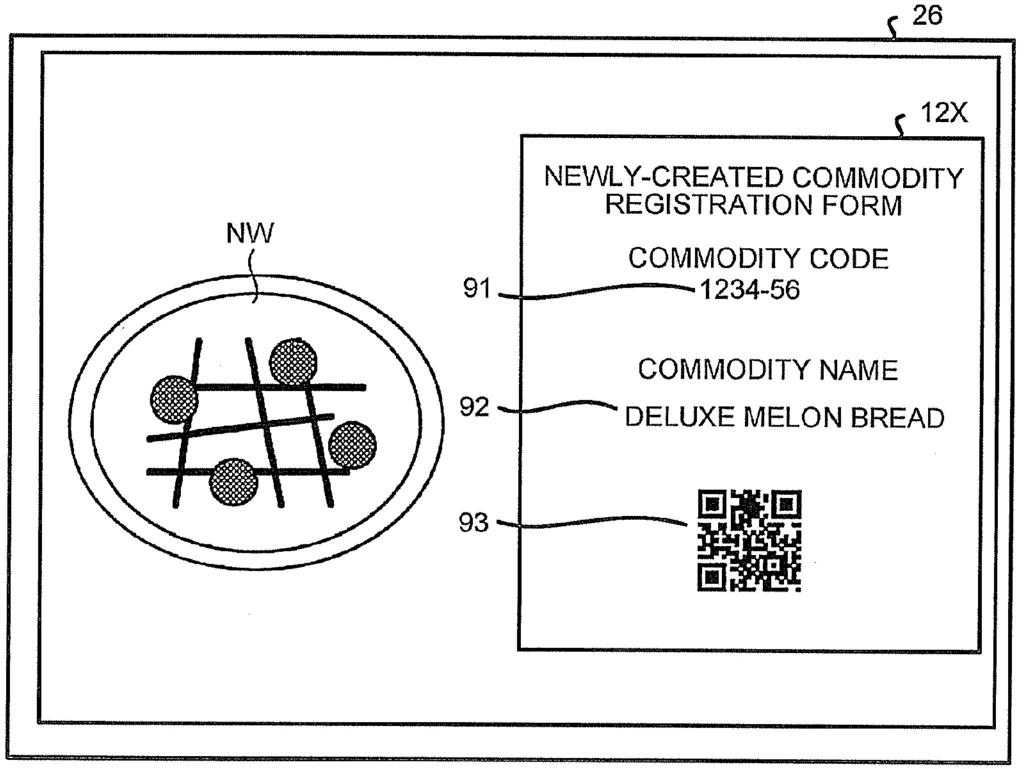
FIG. 12 is a diagram illustrating a picked-up image of the commodity of a newly registered object.
FIG. 13 is a diagram illustrating the data in a newly registration.

FIG. 12 is a diagram illustrating a picked-up image of the commodity of a newly registered object.

The camera unit 22 pickups so that the new commodity registration sheet 12*x* and the commodity NW of the newly registered object may be picked-up simultaneously in the display screen of the display 26.

The CPU 31 of the commodity shelf registration apparatus 11 detects the barcode printing area 93 of the new commodity registration sheet 12X to read a two-dimensional barcode, and then acquires the commodity code 41 and the commodity information data 42 stored as commodity registration information (Act S45).

Meanwhile, the CPU 31 of the commodity shelf registration apparatus 11 determines the mapping area of the commodity NW of the newly registered object and extracts the characteristic quantities of the commodity NW using an existing method (Act S46).

FIG. 13 is a diagram illustrating the data in a newly registration.

Moreover, after the commodity code data 41, the commodity information data 42 and the characteristic quantities are successfully extracted from the picked-up image, first commodity recognition data is registered in the commodity recognition database 40 as the commodity recognition data 43 corresponding to the commodity code data 41, the commodity information data 42 and the characteristic quantities (Act S47).

Specifically, in the case shown in FIG. 13, a commodity code '1234-56' is registered as the commodity code data 41, a commodity name 'deluxe melon bread' is registered as the commodity information data 42, and the commodity recognition data 43 corresponding to the characteristic quantities is registered, just as printed in new commodity registration sheet 12X.

As stated above, a data federation may be easily realized between the commodity shelf registration apparatus 11 and the settlement terminal apparatus 13-1 during the creation of a new commodity registration even the two apparatuses are separately configured.

Therefore, even the commodity shelf registration apparatus 11 is installed after the installation of the settlement terminal apparatuses 13-1 to 13-*n* in a shop, the commodity shelf registration apparatus 11 may be feasibly and easily imported into the existing settlement terminal apparatuses 13-1 to 13-*n*, which greatly reduces setting cost and setting time and significantly improves a settlement system.

In the description above, the data federation between the commodity shelf registration apparatus 11 and the settlement terminal apparatuses 13-1 to 13-*n* is carried out using paper mediums such as the commodity pre-registration sheet 12 and the new commodity registration sheet 12X, however, it should be appreciated that the same data exchange may also be carried out using an electronic storage medium (recording communication medium) that is connected through a wireless network such as Bluetooth (Trademark) in a wireless communication manner or through a wired network such as Ethernet network (Trademark) in a wired communication manner or uses an RFID or USB.

Moreover, commodity codes and commodity information are recorded in two-dimensional barcodes in the commodity pre-registration sheet 12 and the new commodity registration sheet 12X, however, the same contents may also be recorded in one or more one-dimensional barcodes.

The control program executed by the information apparatus 2 (the commodity shelf registration apparatus or the settlement terminal apparatuses 13-1 to 13-*n*) provided herein in this embodiment may be stored in a computer-readable storage medium such as a CD-ROM, FD (Floppy Drive), CD-R, DVD (Digital Versatile Disk) as an installable or executable file, or stored in a computer connected with a network such as the Internet to be provided through a network download, or provided or published by a network such as the Internet, or pre-compiled in an ROM to be provided later.

Although the present invention has been discussed with respect to specific embodiments thereof, these embodiments are merely illustrative but not restrictive of the present invention. The novel embodiments described herein may also be embodied in a variety of other forms, furthermore, various omissions, substitutions and modifications may be devised without departing from the scope of the present invention, and the accompanying claims and their equivalents are intended to cover such forms and modifications as would fall within the scope and spirit of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:

a holding platform configured to hold a commodity not having a commodity identification code for identifying a commodity;

a pickup image unit configured to pickup an image contained the commodity held by the holding platform and output the picked-up image data;

a commodity recognition database configured to pre-store recognition data for recognizing the commodity through an object recognition based on a characteristic quantity of the commodity in association with commodity-related information; and a commodity-specified information output unit configured to extract the characteristic quantity of the commodity contained in the image corresponding to the picked-up image data, specify the commodity for settlement contained in the image with reference to the recognition data stored in the commodity recognition database, and perform pre-registration operation including summing an amount of the commodity for settlement regarding the commodity-specified information corresponding to the specified commodity for settlement, and output a commodity pre-registration sheet on which the summed amount of the pre-registered commodity for settlement is printed in a format that a settlement terminal apparatus can read contents of the pre-registration, wherein the commodity-specified information output unit is configured to print the commodity pre-registration sheet toward in a direction of the holding platform.

2. The information processing apparatus according to claim 1, wherein the commodity-specified information output unit records the output data in a paper-like storage medium as an image.

3. The information processing apparatus according to claim 2, wherein the image recorded in the paper-like storage medium is recorded as a one-dimensional or two-dimensional barcode.

4. The information processing apparatus according to claim 3, further comprising:

an information extraction unit configured to pickup the image of the storage medium printed the commodity information as the image and the commodity corresponded with the commodity information by the pickup image unit and extract the characteristic quantities of the commodity and the commodity information according to the picked-up image data picked-up by the pickup image unit; and a registration unit configured to register a recognition data corresponding to the characteristic quantities extracted by the information extraction unit in association with the commodity information in the commodity recognition database.

5. The information processing apparatus according to claim 2, further comprising:

an information extraction unit configured to pickup the image of the storage medium printed the commodity information as the image and the commodity corresponded with the commodity information by the pickup image unit and extract the characteristic quantities of the commodity and the commodity information according to the picked-up image data picked-up by the pickup image unit; and a registration unit configured to register a recognition data corresponding to the characteristic quantities extracted by the information extraction unit in association with the commodity information in the commodity recognition database.

6. The information processing apparatus according to claim 1, further comprising:

an information extraction unit configured to pickup the image of the storage medium printed the commodity information 5 as the image and the commodity corresponded with the commodity information by the pickup image unit and extract the characteristic quantities of the commodity and the commodity information according to the picked-up image data picked-up by the pickup image unit; and a registration unit configured to register a recognition data corresponding to the characteristic quantities extracted by the information extraction unit in association with the commodity information in the commodity recognition database.

7. The information processing system according to claim 1, further comprising:

a display configured to display a pickup image condition of the commodity by the pickup image unit, and wherein the display is configured to display the pickup image condition of the commodity toward in the direction of the holding platform.

8. An information processing method carried out by an information processing apparatus comprises a holding platform configured to hold a commodity not having a commodity identification code for identifying a commodity, a commodity recognition database configured to pre-store recognition data for recognizing the commodity through an object recognition based on a characteristic quantity of the commodity in association with the commodity information relating to a corresponding commodity and a pickup image unit configured to pickup a image contained the commodity held by the holding platform and output the picked-up image data, comprising:

extracting the characteristic quantity of a commodity contained in the image corresponding to the picked-up image data;

specifying the commodity for settlement contained in the image with reference to the recognition data stored in the commodity recognition database;

performing pre-registration operation including summing an amount of the commodity for settlement regarding the commodity-specified information corresponding to the specified commodity for settlement, and output a commodity pre-registration sheet on which the summed amount of the pre-registered commodity for settlement is printed in a format that a settlement terminal apparatus can read contents of the pre-registration; and printing the commodity pre-registration sheet toward in a direction of the holding platform.

* * * * *